Figure 1:
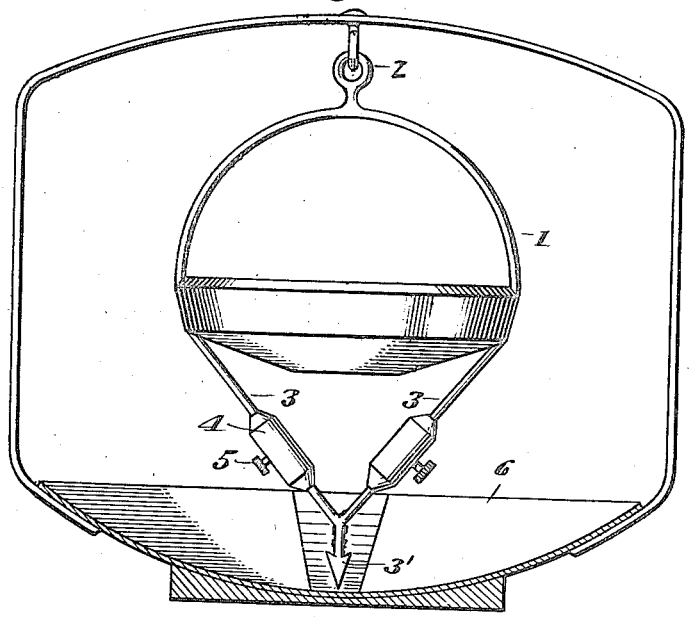

F. C. FISCHER.
AEROCOMPASS.
APPLICATION FILED MAR. 2, 1917.

1,253,190.

Patented Jan. 8, 1918.
3 SHEETS—SHEET 1.

WITNESSES

INVENTOR
Fred C. Fischer
BY Victor J. Evans
ATTORNEY

F. C. FISCHER.
AEROCOMPASS.
APPLICATION FILED MAR. 2, 1917.
1,253,190.
Patented Jan. 8, 1918.
3 SHEETS—SHEET 2.
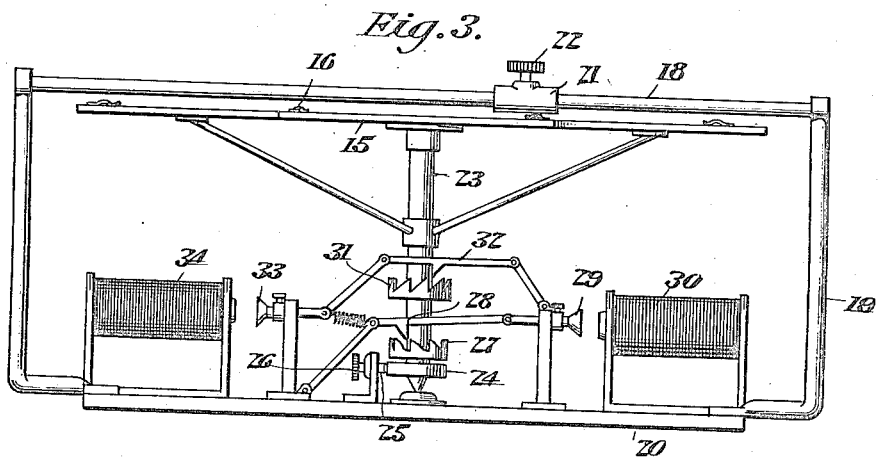
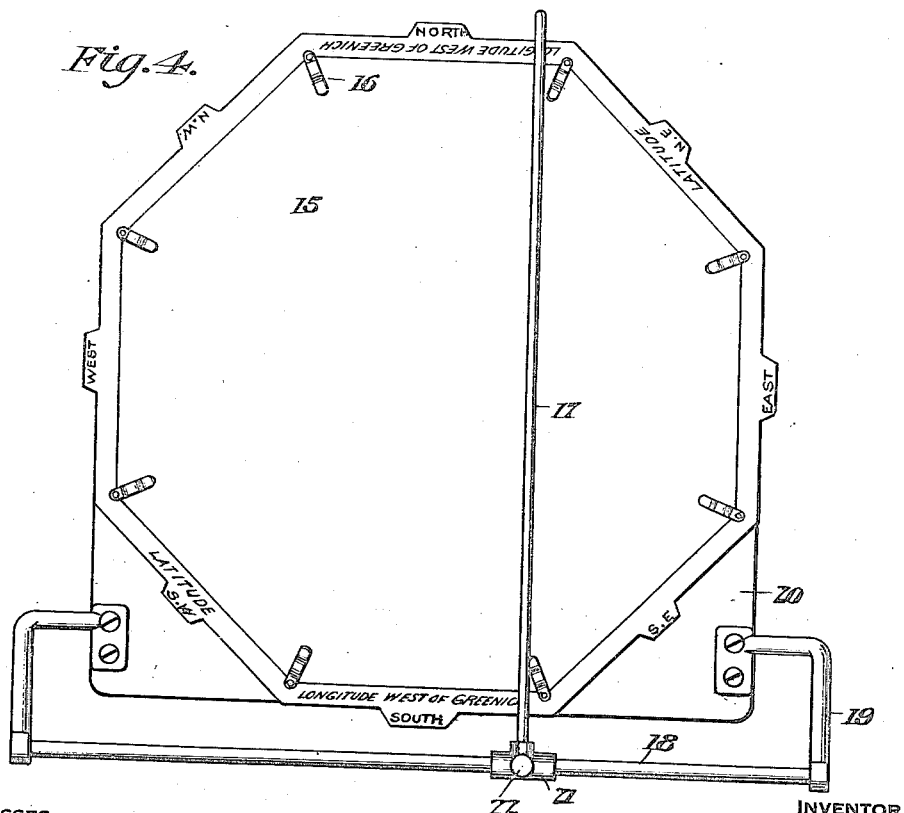
WITNESSES
INVENTOR
Fred C. Fischer
BY Victor J. Evans
ATTORNEY

F. C. FISCHER.
AEROCOMPASS.
APPLICATION FILED MAR. 2, 1917.

1,253,190.

Patented Jan. 8, 1918.
3 SHEETS—SHEET 3.

WITNESSES

INVENTOR
Fred C. Fischer
BY Victor J. Evans
ATTORNEY

UNITED STATES PATENT OFFICE.

FRED CHARLIE FISCHER, OF ROBSTOWN, TEXAS.

AEROCOMPASS.

1,253,190.  Specification of Letters Patent.  Patented Jan. 8, 1918.

Application filed March 2, 1917. Serial No. 152,052.

*To all whom it may concern:*

Be it known that I, FRED C. FISCHER, a citizen of the United States, residing at Robstown, in the county of Nueces and State of Texas, have invented new and useful Improvements in Aerocompasses, of which the following is a specification.

This invention relates to improvements in compasses, more especially to those combined with inclinometers or map-boards.

The primary object of this invention is to combine with a compass a map-board, and means whereby a map mounted thereon may be automatically maintained in correct relation to the points on the earth's surface indicated on said map, notwithstanding any variation in the position of the air-craft, vessel, or other vehicle upon which this compass and map-board may be installed.

Another object is to provide an improved means whereby the movements of the needle of a magnetic compass may be ascertained by an observer at a distance, who may be located in the neighborhood of electric machinery, large masses of iron or steel, or other objects which would make impossible the use of the ordinary magnetic compass in their vicinity. For instance, this invention is especially applicable to submarines; as the magnetic portion of the instrument may be placed upon the periscope or elsewhere beyond the influence of the steel hull, while the map-board indicating the movements of the compass may be placed at any point within the hull.

A third object is to provide in a compass, means whereby an aviator using said compass may ascertain instantly and accurately any deviation of his aeroplane from the normal flying position. This feature is equally applicable to submarines and other vessels.

A fourth object is to provide an improved means of maintaining with an aeroplane or other vehicle a straight course from one given point on the earth's surface to another.

Other objects will appear upon examination of the drawings, description and claims hereto appended.

For purposes of illustration I have embodied my invention in the form shown in the accompanying drawings in which the same parts are designated by the same reference characters wherever shown.

Figure 1 represents a side view of the compass when combined with the inclinometer forming a part of this invention.

Figure 2:
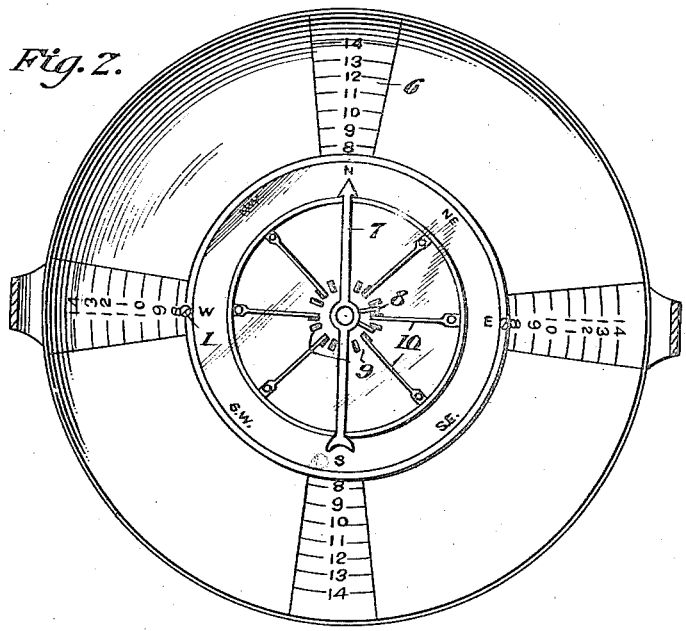
Figure 6:
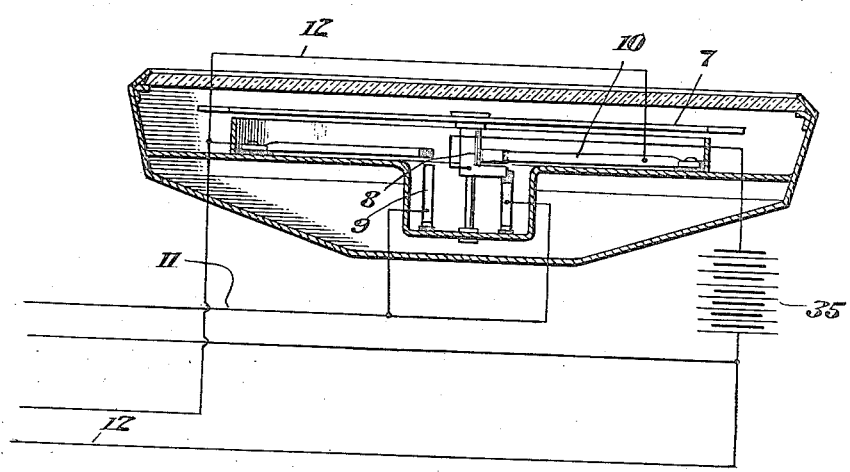
Figure 5:
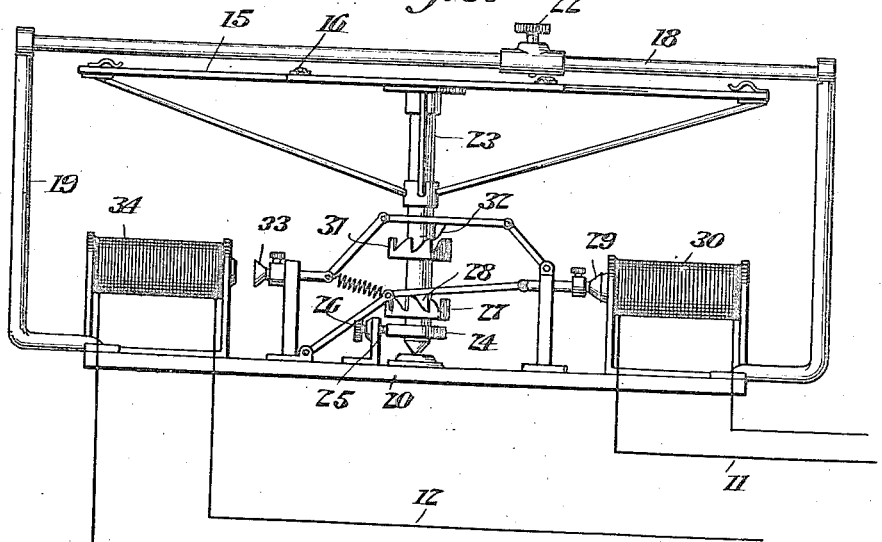

Fig. 2 is a top view of the same.
Fig. 3 is a side view of the map-board.
Fig. 4 is a top view thereof.
Fig. 5 shows in detail means by which the map-board is actuated.
Fig. 6 shows in detail means whereby the compass is enabled to transmit the necessary electric impulses to actuate the map-board.

Referring now to the drawings in detail, in Figs. 1, 2 and 6, 1 is a frame of a compass of the ordinary magnetic variety although the use of a gyroscopic compass is equally practical in connection with this invention. Said compass is suspended by means of the frame 1 from a universal joint 2. Attached to the frame of the compass 1 are inwardly and downwardly extending rods 3 upon which are slidably mounted weights 4, said weights being provided with set screws 5 for the purpose of securing them to the rods where desired. The lower portions of the rods 3 are combined to form a pointer or indicator 3', below which is a graduated surface 6, here shown as concave. Centrally positioned in the compass 1 is the magnetic needle thereof 7 pivoted upon jeweled or other delicate bearings in the manner usually adopted in such instruments. To the needle 7 is attached a contact member 8. In the path of the contact member 8 is a series of flexible contacts 9 having upon one side of their tips insulating material so disposed as to permit electric connection between the said contacts and contact member 8, when the compass needle is rotated in a clockwise direction and to prevent said connection when said compass needle is oppositely rotated. Above the first series 9 is a second series 10 of similarly flexible contacts likewise in the path of contact member 8 which is constructed of sufficient width to include both sets of contacts. The series of contact members 10 are insulated at the tips in a similar manner to the contact members 9, the insulation however, being placed upon the opposite side in the case of said contact members 10, thereby permitting electric connection with the contact member 8 only when the compass needle is rotated in a counter-clockwise direction relative to the frame. 1. The contact members 9 are properly insulated from the frame of the compass whereon these contacts are mounted but are in electric connection with each other by means of a wire 11 prolonged beyond the instrument for connection to the other portions of the apparatus. The contact members 10 are similarly insulated from the frame upon which they are mounted and similarly connected by the wire 12, also prolonged beyond the instrument.

In Figs. 3, 4 and 5, 15 is a board adapted to receive a map and provided at its edges with spring clips 16 adapted to hold a map in position upon the board. Located immediately over the surface of the map-board is a rod 17 serving as a direction indicator and slidably attached at one end to a second rod 18, also extending parallel to the surface of the map-board 15, and affixed at its extremities to vertical prolongations 19 of the stationary base 20 of the instrument. Means of attachment, 21, between the rods 17 and 18 is provided; with a set screw 22 adapted to prevent movement of 21 upon 18 when desirable. Serving as a means of support for the map-board 15 is a vertical shaft or spindle 23 suitably journaled in bearings affixed to the base 20. Keyed near the lower extremity of said spindle is a brake disk 24 of any suitable material, against which bears a friction member 25 adjustable by means of a screw 26. Immediately above the brake disk 24 is keyed or otherwise secured to the spindle 23, a left hand ratchet wheel 27, having teeth equal in number to the contact members 9 shown in Figs. 2 and 6. Suitably positioned to engage the teeth and ratchet wheel 27 is a pawl 28 actuated by means of a spring returned armature 29, which is suitably disposed to be attracted by the magnet 30 when the latter is energized, a source of electricity 35 being connected to the magnet 30 and the flexible contact series 9, of Figs. 1, 2 and 6, in such a manner that upon contact member 8 establishing electric connection with any member of the series 9, magnet 30 will be energized. Positioned above the left hand ratchet wheel 27 is a right hand ratchet wheel 31 adapted to be rotated by a pawl 32, a spring retracted armature 33 and a magnet 34, said members being similar in design and function to those described in connection with said ratchet wheel 27, magnet 34, however, being connected with the flexible contact series 10 shown in Figs. 2 and 6.

The operation of the mechanism causing the map-board 15 to rotate in unison with a relative rotation between the compass needle 7 and its frame will now be obvious. Such rotation of movement of the needle 7 in a clockwise direction will cause contact member 8 to successively establish electric connection with a number of the flexible contacts 9 corresponding to the extent of such rotation; thereby transmitting a series of impulses through the wire 11, and energizing the magnet 30 a corresponding number of times, which magnet on being energized by each of said impulses will actuate the pawl 28 and consequently rotate the spindle carrying the map-board 15, in a clockwise direction similar to the movement of the compass needle. The operation of the instrument is precisely similar when the needle is oppositely rotated, but in this case the contact member 8 establishes connection with the flexible contacts 10, thereby energizing the magnet 34 which actuates the pawl 32, causing a counter-clockwise rotation of the spindle 23; corresponding in degree and direction with that of the movement of the compass needle relative to its frame.

The purpose of the directed rod 17 shown in Fig. 4 is to assist in following a straight course, to accomplish which purpose the instrument must be so mounted that the rod points in the direction in which the vehicle, upon which the map-board is installed, is adapted to travel. When in use the vehicle is first pointed in the direction of the desired destination and the rod 17 is slid along the stationary rod 18 until said rod 17 is vertically above said destination as indicated on the map. The map-board being automatically maintained in correct relation to the portion of the earth's surface represented on the map, any variation from the proper course will cause a relative movement of the rod 17 and the point of destination as shown on the map, indicating such variation.

The inclinometer incorporated in my invention as shown in Fig. 1 differs from those previously used in that the pointer thereof is composed of the rods and adjustable weights 4 mounted thereon, said weights permitting compensation of the balance of the instrument adjustment of the pointer relative to the surface 6 or variation of the period of oscillation of the instrument.

It is to be understood that I do not restrict myself to the particular embodiment of my invention as here shown and described, such embodiment being merely intended to illustrate one of many possible forms of the invention.

What I claim is:

1. The combination with a compass, and means actuated by said compass for transmitting electrical impulses; of a revoluble map-board, a stationary rod parallel to the surface of said map-board; an indicator rod slidably attached at one end to said stationary rod and extending over the surface of said map-board, and means of locking said indicator rod to said stationary rod; and means responsive to said electrical impulses for rotating said map-board; in accordance with the movements of the compass.

2. The combination with a compass, and means actuated by said compass for transmitting electrical impulses, of a map-board, a stationary rod extending parallel to the surface of said map-board, an indicator rod slidably attached at one end to said stationary rod and extending over the surface of the map-board, and means for locking said indicator rod to said stationary rod; a spindle upon which said map-board is mounted, a frame structure in which said spindle is journaled, a pair of ratchet wheels on said spindle, a pair of upstanding arms on said frame structure, armatures having means whereby they are slidably mounted on said arms, magnets disposed for attraction of said armatures, said magnets responsive to impulses transmitted by said compass actuated means, links extending in proximity to said ratchet wheels, pawls on said links, pivotal connecting means between one end of each link and a respective armature, and links having pivotal connections to the first mentioned links and to said arms, the second mentioned links disposed at an angle to the first mentioned links whereby in the attraction of said armatures by said magnets the pawls will be brought into engagement with the ratchet wheels.

3. The combination with a compass, and means actuated by said compass for transmitting electrical impulses, of a map-board, a stationary rod extending parallel to the surface of said map-board, an indicator rod slidably attached at one end to said stationary rod and extending over the surface of the map-board, and means for locking said indicator rod to said stationary rod; a spindle upon which said map-board is mounted, a frame structure in which said spindle is journaled, a pair of ratchet wheels on said spindle, a pair of upstanding arms on said frame structure, armatures having means whereby they are slidably mounted on said arms, magnets disposed for attraction of said armatures, said magnets responsive to impulses transmitted by said compass actuated means, links extending in proximity to said ratchet wheel, pawls on said links, pivotal connecting means between one end of each link and a respective armature, links having pivotal connections to the first mentioned links and to said arms, the second mentioned links disposed at an angle to the first mentioned links whereby in the attraction of said armatures by said magnets the pawls will be brought into engagement with the ratchet wheels, a brake disk on said spindle, and a friction member having means whereby it is adjustably clamped against said disk.

In testimony whereof I affix my signature.

FRED CHARLIE FISCHER.